US008248651B2

(12) United States Patent
Fukuda

(10) Patent No.: US 8,248,651 B2
(45) Date of Patent: Aug. 21, 2012

(54) IMAGE PROCESSING APPARATUS, IMAGE PROCESSING METHOD, AND PROGRAM THEREFOR

(75) Inventor: Tatsuya Fukuda, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/537,101

(22) Filed: Sep. 29, 2006

(65) Prior Publication Data

US 2007/0020009 A1    Jan. 25, 2007

Related U.S. Application Data

(63) Continuation of application No. PCT/JP2006/313179, filed on Jun. 27, 2006.

(30) Foreign Application Priority Data

Jun. 29, 2005  (JP) ................................ 2005-189486
Jun. 14, 2006  (JP) ................................ 2006-164707

(51) Int. Cl.
  *G06K 15/00* (2006.01)
  *H04N 1/46* (2006.01)
(52) U.S. Cl. ........ 358/1.18; 358/452; 358/448; 358/540
(58) Field of Classification Search .................. 358/540; 400/62

See application file for complete search history.

(56) References Cited

U.S. PATENT DOCUMENTS

| | | | | |
|---|---|---|---|---|
| 5,502,486 | A * | 3/1996 | Ueda et al. ..................... | 348/239 |
| 5,621,459 | A * | 4/1997 | Ueda et al. ..................... | 348/239 |
| 6,519,046 | B1 * | 2/2003 | Kinjo ............................. | 358/1.1 |
| 7,032,179 | B2 * | 4/2006 | Mack et al. .................... | 715/762 |
| 7,052,196 | B2 * | 5/2006 | Ueno et al. ................. | 400/615.2 |
| 7,265,851 | B2 * | 9/2007 | Kinjo ............................. | 358/1.1 |
| 7,290,950 | B2 * | 11/2007 | Donahoe et al. ................ | 400/76 |
| 2003/0067631 | A1 * | 4/2003 | Kinjo ........................... | 358/1.18 |
| 2004/0250205 | A1 * | 12/2004 | Conning ....................... | 715/517 |
| 2004/0252340 | A1 * | 12/2004 | Komagamine et al. ...... | 358/1.18 |
| 2005/0172224 | A1 * | 8/2005 | Kobashi et al. ............... | 715/517 |
| 2005/0213174 | A1 * | 9/2005 | Maki et al. .................... | 358/540 |
| 2006/0291000 | A1 * | 12/2006 | Maeda et al. ................. | 358/452 |
| 2007/0212144 | A1 * | 9/2007 | Matsuzaka et al. ............ | 400/62 |

FOREIGN PATENT DOCUMENTS

| | | | |
|---|---|---|---|
| JP | 4-19695 | * | 1/1992 |
| JP | 10-200727 | | 7/1998 |
| JP | 10-260482 | * | 9/1998 |
| JP | 2003080789 A | * | 3/2003 |
| JP | 2006-050386 | | 2/2006 |

* cited by examiner

*Primary Examiner* — Marivelisse Santiago Cordero
*Assistant Examiner* — Huo Long Chen
(74) *Attorney, Agent, or Firm* — Fitzpatrick, Cella, Harper & Scinto

(57) ABSTRACT

Provided is an image combination apparatus, in which: a handwritten original area aspect ratio corresponding to an aspect ratio of a handwriting area in which a handwritten original is to be written and a predetermined image aspect ratio corresponding to an aspect ratio of a predetermined image are compared with each other, when the handwriting area aspect ratio and the predetermined image aspect ratio differ from each other, an area to be cut out from the predetermined image is set in accordance with the handwritten original area aspect ratio; the set cutout area is cut out from the predetermined image; the image obtained by cutting out and the handwritten original are combined with each other.

12 Claims, 12 Drawing Sheets

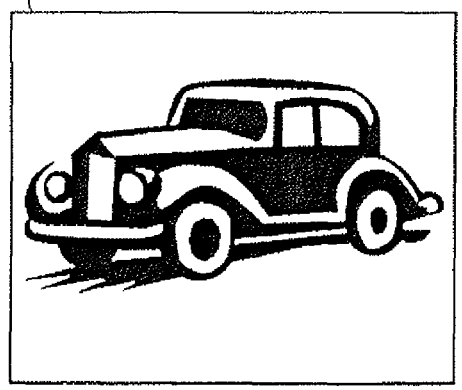
FIG. 7A
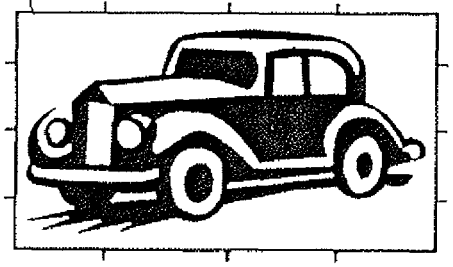
FIG. 7B
FIG. 7C
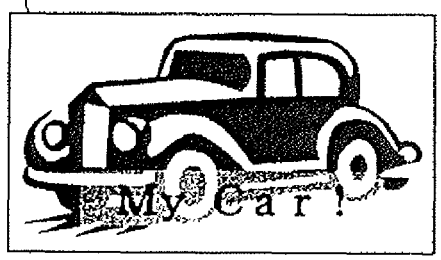
FIG. 7D
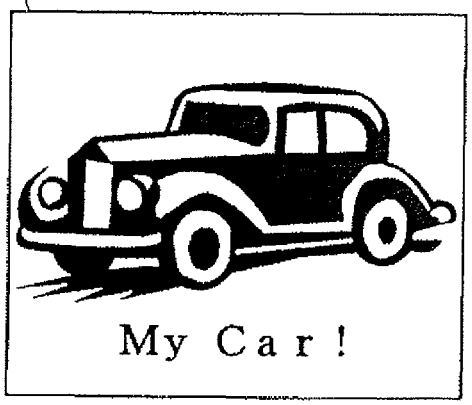
FIG. 7E

IMAGE PROCESSING APPARATUS, IMAGE PROCESSING METHOD, AND PROGRAM THEREFOR

CROSS REFERENCE TO RELATED APPLICATIONS

This application is a continuation of International Application No. PCT/JP2006/313179, filed on Jun. 27, 2006. The entire disclosure of this prior application is incorporated by reference herein.

This application is a continuation of International Application No. PCT/JP2006/313179, filed on Jun. 27, 2006, which claims the benefit of Japanese Patent Application Nos. 2005-189486 filed on Jun. 29, 2005, and 2006-164707 filed on Jun. 14, 2006.

BACKGROUND OF THE INVENTION

1. Field of the Invention

The present invention relates to a function of attaching a storage medium for storing image data taken by a digital camera, and reading and printing the image data stored in the storage medium, in particular, an image processing apparatus, an image processing method, and a program, for reading a handwritten character, a handdrawn illustration, and the like, combining the read handwritten original with selected image data, and printing the resultant.

2. Description of the Related Art

In recent years, with the diffusion of digital cameras, there is an increasing demand for printing out (photoprinting) an image taken by a digital camera in the home. In general, in order to print out the image taken by the digital camera, a storage medium reader (hereinafter, referred to as a "memory card reader") is connected to a personal computer (hereinafter, referred to as a "PC"). Then, a storage medium (hereinafter, referred to as a "memory card") that stores the image taken by the digital camera is attached to the memory card reader to load the image data into the PC. Then, the PC and a printer are connected to each other for printout.

As an apparatus for enabling a user who is not skilled in the PC to easily obtain a photoprint, a so-called direct printer apparatus and a so-called multi-function printer apparatus (hereinafter, referred to as an "MFP apparatus") capable of providing a plurality of functions are commercially available. Each of these apparatuses includes a memory card slot for attaching a memory card that stores an image taken by a digital camera to the apparatus. An operation section on the apparatus can be operated to select an image to be printed and to specify a paper size, the number of prints, and the like.

In recent years, equipment including a color LCD screen is also commercially available. With reference to the LCD screen, an image to be printed can be selected. Therefore, even a user who is not skilled in the PC can easily obtain a photoprint.

Further, in the MFP apparatus, a photoprinting method with a print setting sheet is provided to more easily specify the above-mentioned settings for photoprinting. In the photoprinting with the print setting sheet, an image stored in the memory card attached to the MFP apparatus and an area to be marked for selecting the image are first arranged adjacent to each other to make a list. Then, the print setting sheet is printed. The user checks the mark corresponding to the image desired to be printed on the print setting sheet. Then, the marked print setting sheet is placed on an original table of the MFP apparatus, to be scanned for detecting the mark. Thereafter, the image corresponding to the detected mark is printed. By the series of operations, the user can easily print a desired image.

Further, the above-mentioned print setting sheet is developed to provide a handwriting composite print function of combining a character handwritten or an illustration handdrawn by a user with an arbitrary image file and printing the resultant image. On the print setting sheet for providing the handwriting composite print function, an area where the user is to handwrite a character or to handdraw an illustration is printed. In the area, the user handwrites a character or handdraws an illustration. Thereafter, a print setting sheet for handwriting composite print is placed on the original table of the MFP apparatus to read data on the sheet on the original table. The read data of the handwriting area and the selected image data are combined to print out the handwritten character or handdrawn illustration combined with the arbitrary image on a selected piece of paper based on the mark on the composite print setting sheet.

As a combination method for combining a handwritten character or handdrawn illustration as described above, a method of determining the position of a pixel to be combined by using a predetermined key signal to combine photographic image data has been proposed (for example, Japanese Patent Application Laid-Open No. H10-200727).

Next, a procedure of conventional composite printing using the above-mentioned composite print setting sheet will be briefly described.

First, on the LCD screen provided for the MFP apparatus, an image that the user desires to combine and print is selected. Thereafter, the composite print setting sheet is printed out. The selected image is printed out on the print setting sheet as a sample. Adjacent to the image printed as a sample (reference image), a frame indicating an area, in which the composite image is to be drawn, is printed out. Then, the user writes or draws a character or an illustration by hand in the area of the printed-out composite print setting sheet, in which the composite image is to be drawn. Then, the mark corresponding to a paper size after the combination is checked on a mark sheet (mark-sense sheet) to select the paper size after the combination. The thus generated composite print setting sheet is placed on the original table of the MFP apparatus to be scanned. As a result, the handwriting data drawn in the area, in which the composite image is drawn, is read to be combined with the selected image data and then is printed.

SUMMARY OF THE INVENTION

In the above-mentioned procedure, after the composite print setting sheet is printed, the user checks a mark on the mark sheet to determine a piece of paper to be finally printed out. Therefore, in the step of printing the composite print setting sheet, the size of paper, on which the composite print is finally obtained, cannot be obtained.

Therefore, in the case where an aspect ratio of a reference image differs from that of a print area of paper selected on the mark sheet although the reference image area and the handwriting area are arranged adjacent to each other for the purpose of aligning the positions of combination, if the data of the handwritten character or handdrawn illustration and the selected image in the memory card are cut out in an independent manner at the same aspect ratio as that of the print paper, the cutout area of the selected image and that of the handwritten composite image are not identical. Therefore, when the two images are combined, there is a possibility that the images are out of alignment.

As a result, there is a problem in that the data drawn in the handwriting area is not combined at a correct position to prevent the user from obtaining a desired printout.

FIGS. 7A, 7B, 7C, 7D and 7E are views each explaining a positional relation between a photographic image and a handwritten character or handdrawn illustration when the conventional composite print setting sheet is used.

FIG. 7A is a view showing a photographic image G11 taken by a digital camera. FIG. 7B is a view showing a reference image G12 corresponding to an image obtained by printing the photographic image G11 on a print setting sheet. FIG. 7C is a handwritten original G13 corresponding to a character handwritten in a handwriting area printed on the print setting sheet.

FIG. 7D is a view showing a composite image SG11 obtained as intended by the user. FIG. 7E is a view showing a composite image SG12 obtained against the user's intention.

On the composite image SG11, the handwritten characters are combined in alignment with the positions of the respective guide marks. As a result, the result as intended by the user is obtained.

On the contrary, the result of combining the images on paper having a different print area from that of the reference image G12 is a composite image SG12. In this case, the handwritten characters are combined at the positions different from the positions of guide marks for the reference image G12. As a result, the result of combination desired by the user cannot be obtained.

FIGS. 13A, 13B and 13E are views, each illustrating another example of the positional relation between a photographic image and a handwritten character or handdrawn illustration when the conventional composite print setting sheet is used.

FIG. 13A is a view showing a photographic image G31 taken by a digital camera. FIG. 13B is a view showing a reference image G32 corresponding to an image obtained by printing the photographic image G31 on a print setting sheet. The reference image is printed to locate the image in the center with margins on the top and the bottom in such a manner that the entire image is contained in the area where the reference image is to be printed. FIG. 13C is a handwritten original G33 corresponding to characters handwritten in a handwriting area printed on the print setting sheet.

FIG. 13D is a view showing a composite image SG31 obtained as intended by the user. FIG. 13E is a view showing a composite image SG32 obtained against the user's intention.

On the composite image SG31, the handwritten characters are combined in alignment with the positions of the respective guide marks. As a result, the result as intended by the user is obtained.

On the contrary, the result of combining the images on paper corresponding to a different print area from that of the reference image G32 is the composite image SG32. In this case, since a part of the reference image G32 is cut out at the time of combination, the handwritten characters are combined at the positions different from those of the guide marks for the reference image G32. As a result, the result of composition desired by the user from cannot be obtained.

The present invention has an object of providing an image processing apparatus, an image processing method, and a program, which allow a selected image and a handwritten character or handwritten illustration to be combined as intended by a user when the selected image and the handwritten character or handdrawn illustration are combined by using a composite print setting sheet.

According to one aspect of the present invention, there is provided an image processing apparatus including: acquisition means for acquiring an aspect ratio of a predetermined image; first setting means for setting an area in which a handwritten original is to be written; and combination means for combining the image and the handwritten original with each other, and in the image processing apparatus the first setting means sets the writing area in accordance with the aspect ratio acquired by the acquisition means.

The present invention produces such an effect that, when a composite print setting sheet is used to combine a selected image with a handwritten character or handdrawn illustration, the selected image can be combined with the handwritten character or handdrawn illustration as intended by the user.

Further features of the present invention will become apparent from the following description of exemplary embodiments with reference to the attached drawings.

BRIEF DESCRIPTION OF THE DRAWINGS

FIGS. 7A, 7B, 7C, 7D and 7E are views each explaining the positional relation between a photographic image and a handwritten character or handdrawn illustration when a conventional composite print setting sheet is used.

DESCRIPTION OF THE EMBODIMENTS

The best mode for carrying out the invention is described with reference to the following embodiments.

(First Embodiment)

Figure 1:
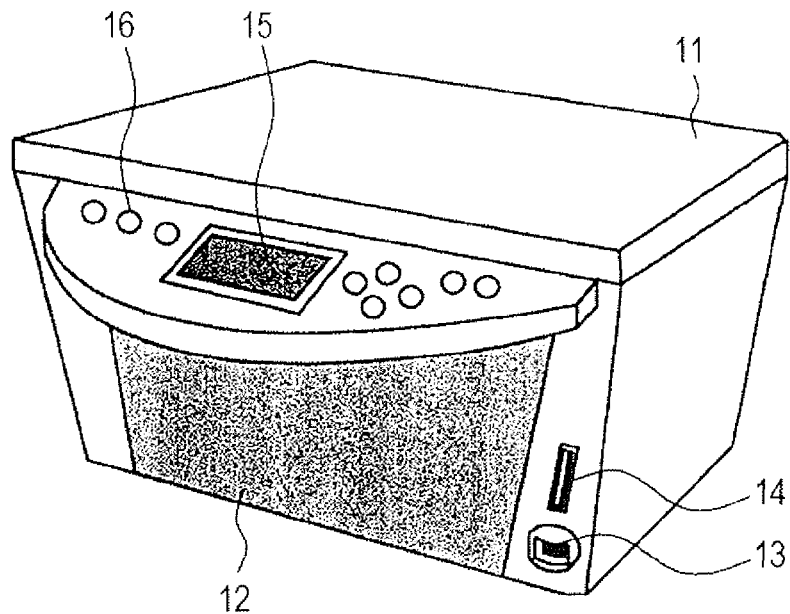
FIG. 1 is a schematic perspective view showing a multifunction printer apparatus (MFP apparatus) 100 corresponding to a first embodiment of the present invention.

FIG. 1 is a schematic perspective view showing a multifunction printer apparatus (MFP apparatus) 100 according to a first embodiment of the present invention.

The MFP apparatus 100 has a function of receiving data from a host computer (PC) and printing the data as a general PC printer. The MFP apparatus also has a scan function of reading an original placed on an original table in response to an operation instruction from the PC, a copy function of copying and printing the original on the original table, a function of reading and printing image data stored in a memory card, and a function of receiving and printing the image data from a digital camera.

The MFP apparatus 100 includes a top cover 11, a discharge tray 12, a connector 13, a card slot 14, a liquid crystal display unit 15, and an operation section 16.

In a state shown in FIG. 1, the top cover 11 is closed. By opening the top cover 11, an original can be placed on an original table (not shown). In the state shown in FIG. 1, the discharge tray 12 is closed. By opening the discharge tray 12 for printing, the discharge tray 12 functions as a discharge tray for printout paper. The connection of the connector 13 for connecting a digital camera to a digital camera (not shown) allows image data stored in a memory in the digital camera to be read out and to be directly printed by the MFP apparatus 100.

The card slot 14 is for accepting the insertion of a memory card. By the insertion of the memory card, the image data stored in the memory card can be read out and printed. As the memory card, there exist CompactFlash (registered trademark), Smart Media (registered trademark), Memory Stick, and the like.

When an image desired to be printed out is searched from the images stored in the memory card, an image for each frame, an index image, or the like is displayed on the liquid crystal display unit 15. A screen for various settings such as a paper size, a magnification, a copy density, and the like for copying in the MFP apparatus 100 or for operating a maintenance function or the like of the MFP apparatus 100 is also displayed on the liquid crystal display unit 15. Further, if some failure occurs in the MFP apparatus 100, a screen showing the status of the MFP apparatus 100, a screen showing the operation guidance when a prohibited operation is performed, or the like is displayed on the liquid crystal display unit 15.

The operation section 16 is for operating the MFP apparatus 100, and includes a plurality of operation keys such as up, down, left, and right arrow keys, a copy mode key, and a print start key. By pressing the keys, the operation section 16 cooperates with the screen displayed on the liquid crystal display unit 15 to operate the MFP apparatus 100.

The operation section 16 also functions as a scanner apparatus for reading out the original placed on the original table in response to an operation instruction from the PC.

Figure 2:
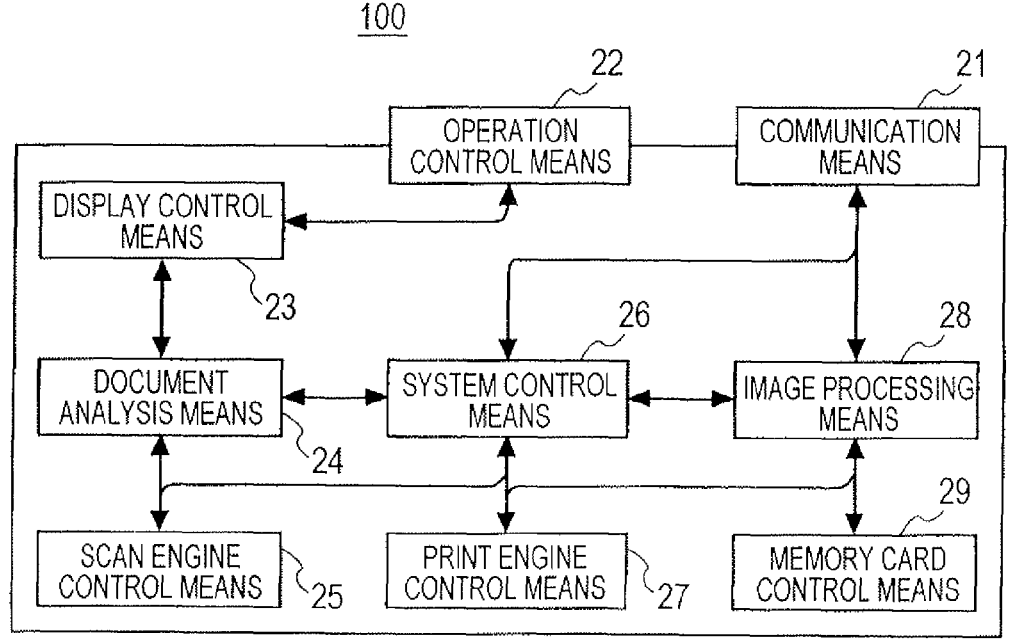
FIG. 2 is a functional block diagram showing the MFP apparatus 100.

FIG. 2 is a functional block diagram showing the MFP apparatus 100.

The MFP apparatus 100 includes communication means 21, operation control means 22, display control means 23, document analysis means 24, scan engine control means 25, system control means 26, print engine control means 27, image processing means 28, and memory card control means 29.

The communication means 21 controls data communication with the PC connected to a PC connector (not shown) or data communication with the digital camera connected to the connector 13 for connection to the digital camera.

The operation control means 22 has a function of detecting the press of various keys of the operation section 16 of the MFP apparatus 100, converting the press into a logical key operation message, and transmitting the message to the display control means 23.

The display control means 23 displays an image to be printed, displays a trimming area for a selected image, and the like in response to the key operation message transmitted from the operation control means 22 to cause the liquid crystal display unit 15 to display the setting of the number of copies, the paper size, and the like for copying.

The document analysis means 24 has a function of analyzing a document of the original, which is converted into data by the scan engine control means 25. To be specific, the document analysis means 24 reads a barcode or a mark designated through the print setting sheet SH1 to generate print setting and image print setting information for photoprinting, and starts photoprinting. The document analysis means 24 also reads a character handwritten or an illustration handdrawn by a user to generate data to be combined.

The scan engine control means 25 has a function of controlling scan to read the copy or the print setting sheet SH1 and is also used for PC scan.

The system control means 26 has a function of arbitrating various control means. The system control means 26 also arbitrates exclusive control of a physical resource and sequence control, and manages the status of the MFP apparatus 100 such as various errors and a remaining amount of ink.

The print engine control means 27 has a function of performing control regarding a print processing such as copy printing, photoprinting, and PC printing, including ink drop discharge control, paper feeding or ejection, print head control, and the like.

The image processing means 28 has a function of converting the print data transmitted from the PC and transmitting the converted data to the engine control means 27. The image processing means 28 also performs a decode processing, a trimming processing, and the like of the image in photoprinting. The image processing means 28 retains area information of a print layout, and performs a processing of locating the image data and the like at a layout position, an image processing such as a scaling processing, a color processing, a binarization processing, a brightness, chroma, and red-eye correction processing, and a combination processing with the data to be combined generated by the document analysis means 24.

The memory card control means 29 performs a read/write processing on an image file stored in the memory card attached to the card slot 14, analyzes the details of the image data information stored in the memory card, and manages a directory thereof.

To be specific, the scan engine control means 25 obtains a handwriting area aspect ratio corresponding to an aspect ratio of a handwriting area 50, corresponding to an area in which a handwritten original 51 is written or drawn. The scan engine control means 25 obtains a predetermined image aspect ratio corresponding to an aspect ratio of a predetermined image. The "predetermined image" is a photographic image. However, any image other than the photographic image may be used.

The system control means 26 compares the handwriting area aspect ratio and the predetermined image aspect ratio with each other. When the handwriting area aspect ratio and the predetermined image aspect ratio differ from each other, the system control means 26 sets a predetermined image cutout area in accordance with the handwriting original area aspect ratio. Further, the predetermined image is cut out (or trimmed), based on the area set by the cutout area setting means.

The image processing means 28 combines the cutout image and the handwritten original.

Next, in the first embodiment, a detailed procedure of using the composite print setting sheet SH1 to obtain a composite print will be described.

Figure 3:
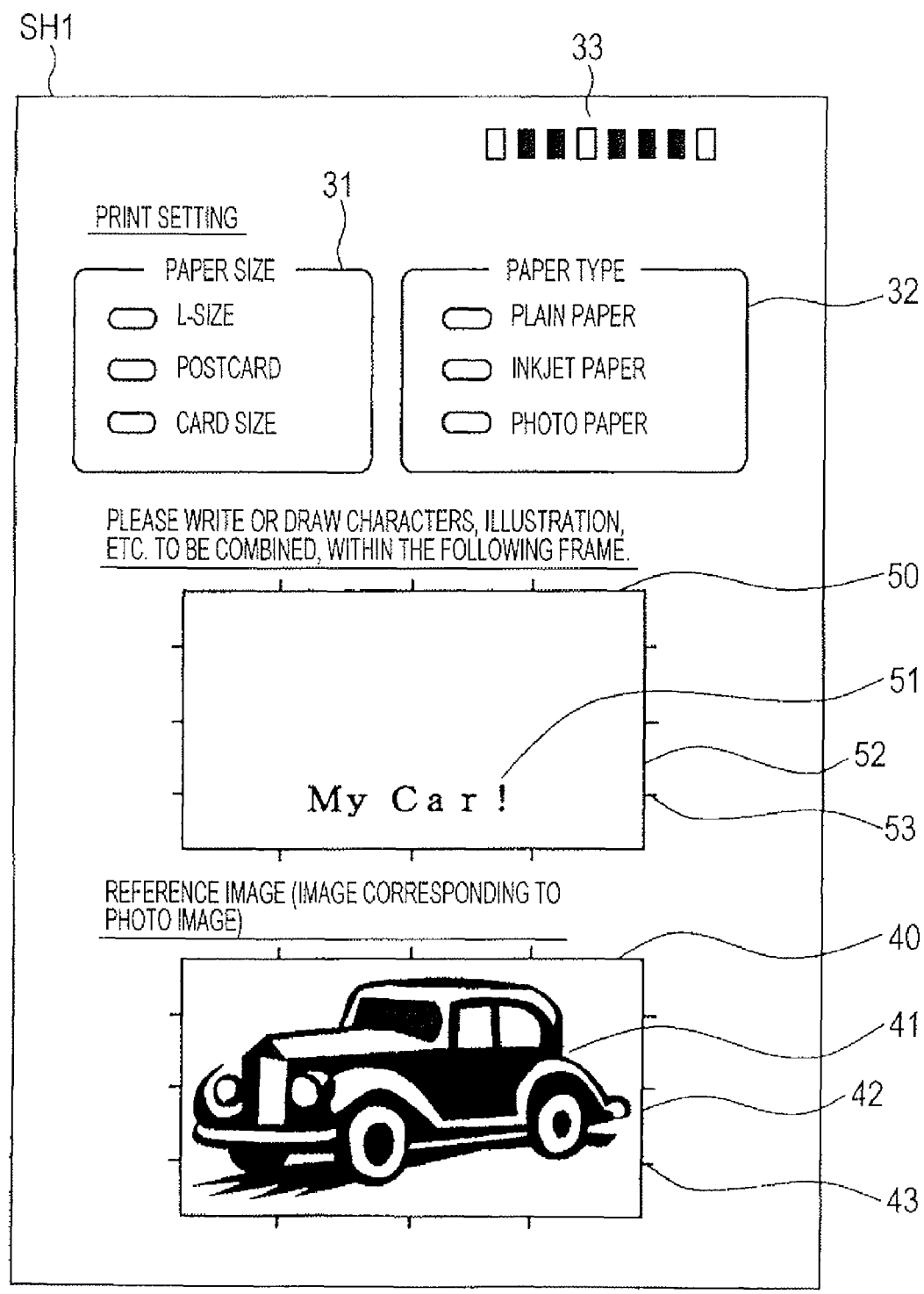
FIG. 3 is a view showing a composite print setting sheet SH1 used in the first embodiment.

FIG. 3 is a view showing the composite print setting sheet SH1 used in the first embodiment.

The composite print setting sheet SH1 is a setting sheet for combining the photographic image and the handwritten original and for enabling the user to set in a comprehensive manner as to which photographic image of a plurality of photographic images stored in the memory card is referred to and at which position in the referred image the handwritten original is combined.

The composite print setting sheet SH1 includes a paper size setting area 31, a paper type setting area 32, a barcode 33, a reference image area 40, and the handwriting area 50. The reference image area 40 and the handwriting area 50 are printed adjacent to each other.

In the paper size setting area 31, a mark for a paper size to be selected by the user from an L-size, a postcard size, and a card size for paper, which is to be blacked out, is provided. In the paper type setting area 32, a mark for a paper type to be selected by the user from plain paper, ink-jet printing paper, and photo paper, which is to be blacked out, is provided. The barcode 33 is encoded and printed information regarding a selected photographic image (a number and the like) and other additional information.

In the reference image area 40, a reference image 41, a frame line 42, and guide marks 43 are printed. The reference image 41 is an image corresponding to the photographic image selected by the user from a plurality of photographic images. The frame line 42 is a line surrounding the reference image area 40.

In the handwriting area 50, a frame line 52 and guide marks 53 are printed. The frame line 52 is a line surrounding the handwriting area 50. Inside the frame line 52, the handwritten original 51 is written or drawn. The handwritten original 51 is a handwritten character or a handdrawn illustration.

The reference image area 40 and the handwriting area 50 have the similarity both in a horizontal direction and in a longitudinal direction (that is, the aspect ratios are the same). The user visually compares the guide marks 53 and 43 with each other to specify a relative position between the reference image 41 and the handwritten original 51 after the combination and then write or draw a character or an illustration.

Next, in the first embodiment, a procedure of printing the composite print setting sheet SH1 will be described.

Figure 4:
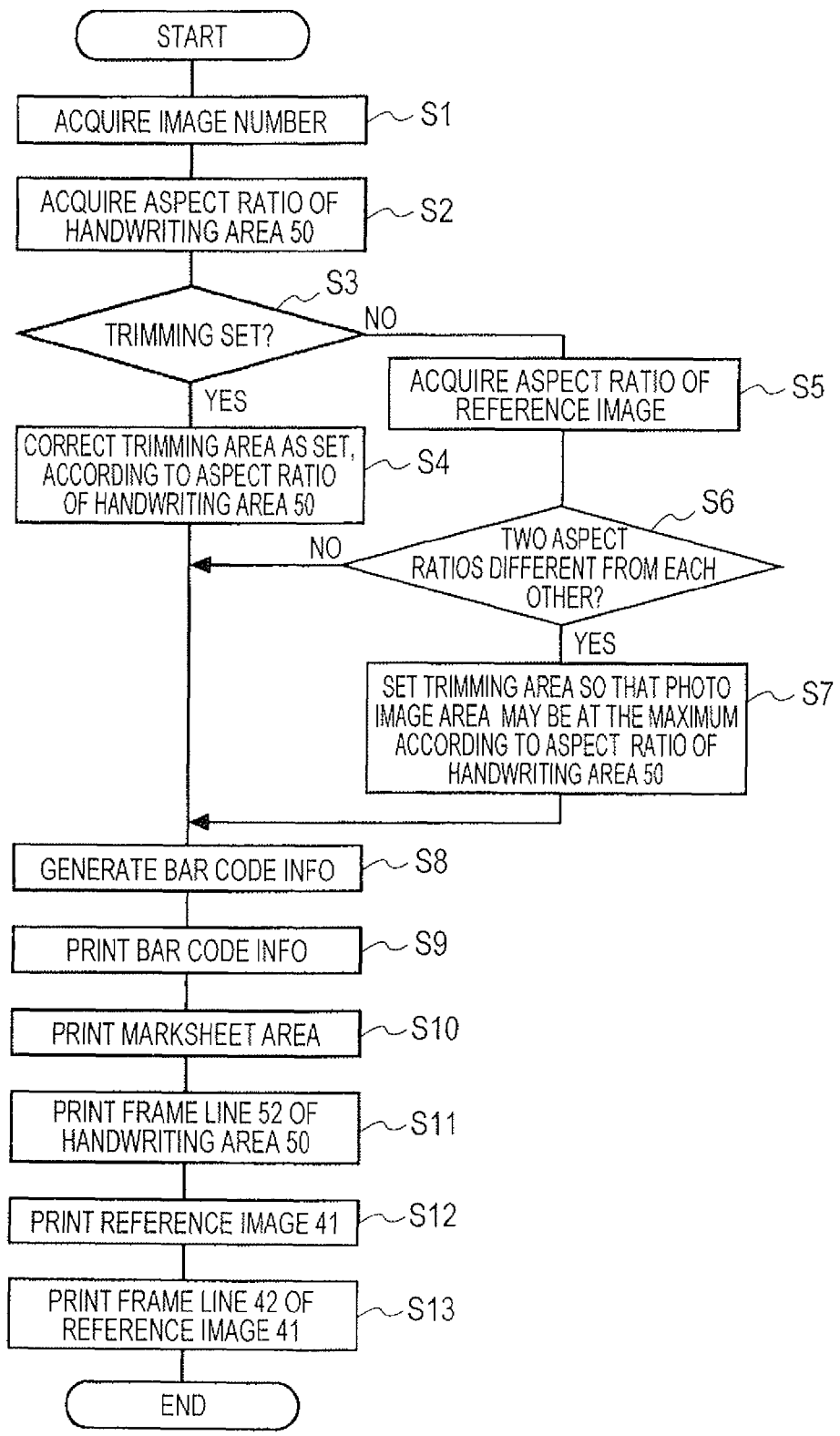
FIG. 4 is a flowchart showing a procedure of printing the composite print setting sheet SH1 in the first embodiment.

FIG. 4 is a flowchart showing a procedure of printing the composition print setting sheet SH1 in the first embodiment.

The user operates the operation section 16 to select an image to be combined with reference to the liquid crystal display unit 15 and then starts printing the print setting sheet SH1. For the image to be selected, the user is free to set the trimming area. It is assumed that the paper size of the print setting sheet SH1, on which the printing is performed, is A4.

First, an image number corresponding to the image selected by the user is acquired (S1). The image processing means 28 acquires an aspect ratio of the handwriting area 50, in which the handwritten original 51 is to be written or drawn (S2).

Next, in the step of image selection, it is judged whether or not the trimming has been set by the user (S3). If the trimming area is preset, the trimming area is corrected in accordance with the aspect ratio of the handwriting area 50, which is acquired in Step S2 (S4).

If the trimming area is not set in Step S3, the image processing means 28 acquires the aspect ratio of the reference image area 40 (S5) and compares the aspect ratio acquired in Step S2 and the aspect ratio of the reference image 41 acquired in Step S5 with each other (S6). When the two aspect ratios differ from each other, the trimming area of the reference image 41 is set to minimize an area to be cut out in accordance with the aspect ratio of the handwriting area 50, as a cutout area from the selected image (S7).

As described above, by setting the trimming area, a common cutout processing can be used for decoding the image data.

Next, information of the image number of the photographic image and information of the set trimming area are generated as barcode information for reference at the time of final printing (S8).

Next, based on the barcode information generated in Step S8, the barcode information is printed (S9). Then, a mark sheet area for marking out a print setting is printed (S10).

Next, the frame line 52 for designating an area, in which a handwritten character or handdrawn illustration is to be written or drawn, is printed (S11). By adding data of the guide marks 53 to data of the frame line 52 in advance, the processing for the guide marks 53 can be omitted.

Next, the reference image 41 is printed in the reference image area 40 (S12). In accordance with the trimming area set in Step S4 or Step S7, the trimming processing is performed.

Next, the frame line 42 for reference image, with the guide marks 43 for recognizing the relative position with respect to the handwriting area 50, is printed outside of the reference image 41 (S13). For the print processing executed in Steps S9 to S13, a processing of generating barcode rectangular data, a processing of decoding an image in the memory card, a color space conversion processing, a binarization processing for printout, and the like are executed. Those processings can be realized by a known technique and do not affect the nature of the present invention. Therefore, the detailed description thereof is herein omitted.

By the above-mentioned procedure, the composition print setting sheet SH1 is printed. Although the paper size of the composite print setting sheet SH1 is A4 in the first embodiment, various paper sizes can be treated by executing the above-mentioned procedure. Further, even when the layout arrangement of the print setting sheet SH1 or the size of the handwriting area 50 is changed, the print setting sheet SH1 or the handwriting area 50 can be used without any change. The present invention is not limited to the size or the layout of the A4 paper in the first embodiment.

Next, a procedure of reading the composite print setting sheet SH1 to perform the final printing in the first embodiment will be described.

Figure 5:
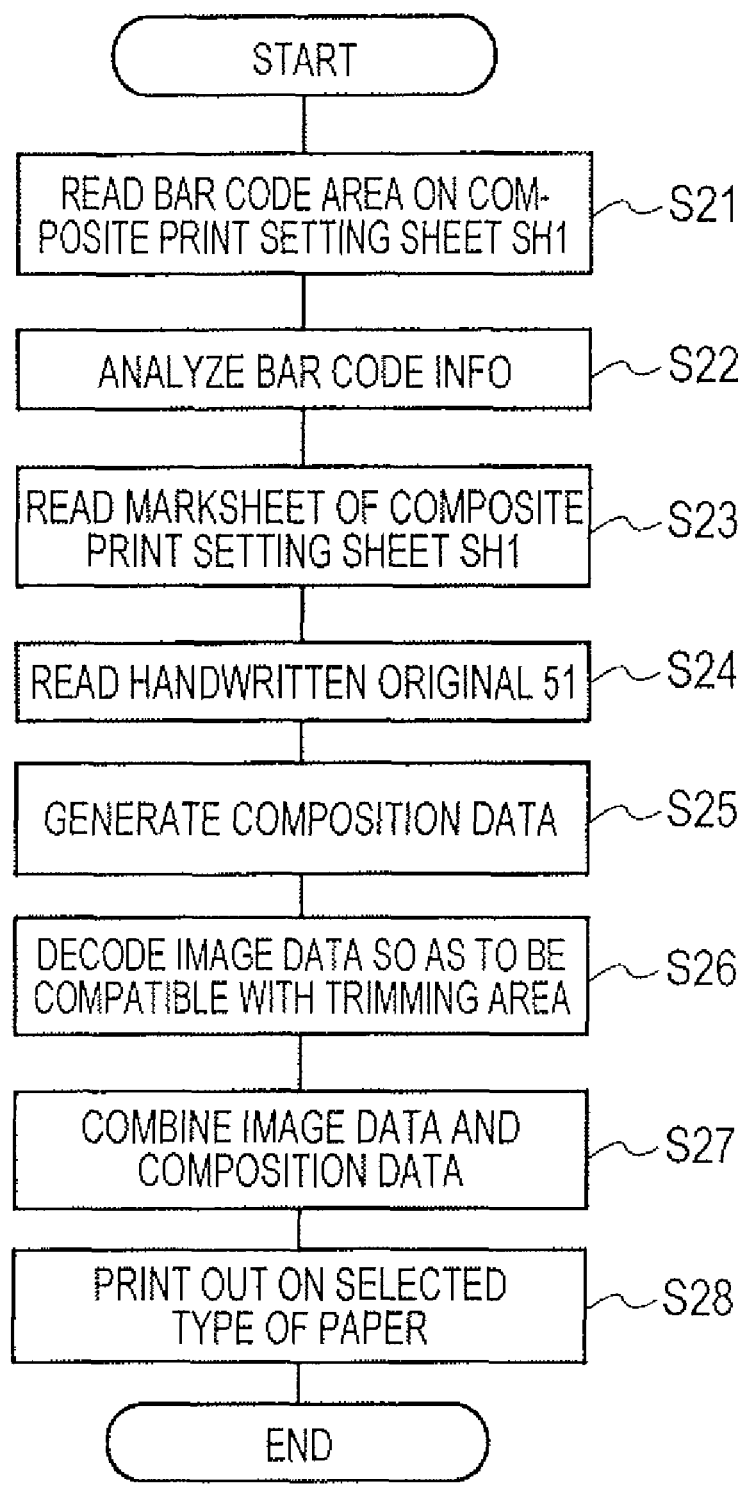
FIG. 5 is a flowchart showing a procedure of reading the composite print setting sheet SH1 for printing in the first embodiment.

FIG. 5 is a flowchart showing the processing of reading the composite print setting sheet SH1 to perform the final printing in the first embodiment.

It is assumed that a mark sheet (or mark-sense sheet) (including the paper size setting area 31, the paper type setting area 32, and the barcode 33) on the composite print setting sheet SH1 is checked appropriately in advance by the user and a character or an illustration has already been written or drawn in the handwriting area 50. The user places the print setting sheet SH1 on the original table of the MFP apparatus 100, operates the operation section 16, and reading the print setting sheet SH1 is started.

First, the barcode 33 printed on the print setting sheet SH1 is read (S21), and the information of the read barcode 33 is analyzed (S22). As the information of the barcode, the "image number" and the "trimming information" printed on the print setting sheet SH1 in Step S9 are recorded.

Next, the mark sheet areas 31 and 32 on the print setting sheet SH1 are read (S23) to read the size and the type of paper. Then, the handwritten original 51 written in the handwriting area 50 is read (S24) to analyze the read image data and generate composition data of the handwritten original 51

(S25). When the composition data is generated, an under color removal processing on the read data is performed or dust data generated by noises or the like at the time of reading is removed. The image processings such as recognition of the position of a handwritten character or a handdrawn illustration and generation of a transmission mask pattern used for combination are performed. Because these image processings are known techniques and do not affect the nature of the first embodiment, the detailed description thereof is omitted.

Next, the photographic image corresponding to the image number analyzed in Step S23 is read from the memory card to be decoded (S26). In decoding, a decode processing is performed in the range in consideration of the trimming information analyzed in Step S23, to cut out exclusively the trimming area of the image data.

Next, the image data (i.e., the data of the photographic image) decoded in Step S26 and the composition data generated in Step S25 are combined with each other (S27). In the combination processing, the combination processing is performed while determining whether the composition data is validated or is transmitted to validate the image data with reference to the transmission mask pattern.

Next, the data obtained by the combination in Step S27 is printed (S28). In Step S28, the print processing is performed in accordance with the paper size and the paper type set on the composite print setting sheet SH1. In Step S28, the image processing is also performed as in the case of the printing of the print setting sheet SH1. For the above-mentioned reason, however, the detailed description thereof is omitted.

Figure 6A:
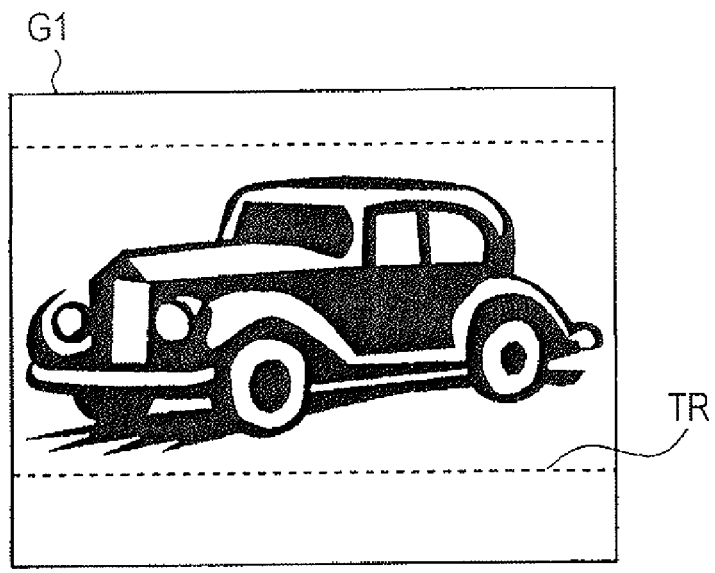
FIGS. 6A, 6B and 6C are views each showing the result of combination in the first embodiment.
Figure 6B:
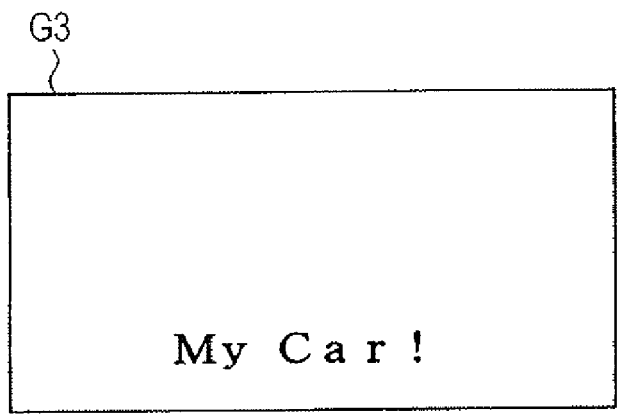
Figure 6C:
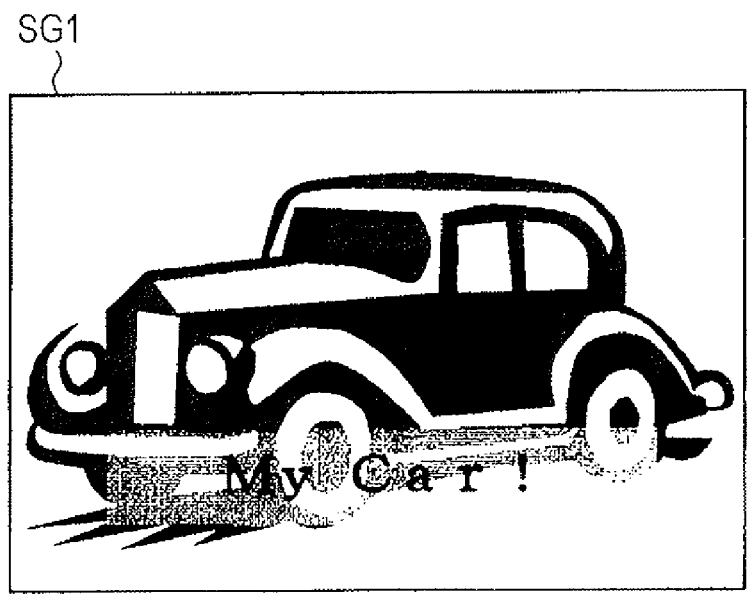

FIGS. 6A, 6B and 6C are views each showing the result of combination in the first embodiment.

A photographic image G1 represents data of an image to be combined. A trimming area TR corresponds to an area to be trimmed on the photographic image G1 and is a trimming area set at the aspect ratio of the handwriting area 50. A composite image SG1 is obtained by combining an image obtained by trimming the photographic image G1 on the basis of the trimming area TR and the handwritten original 51 with each other. The composite image SG1 shows that the handwritten characters are added at the position intended by the user.

According to the first embodiment, since a suitable cutout area is set for the selected photographic image through the composite print setting sheet SH1, the positional relation of the handwritten character or the handdrawn illustration on the print setting sheet SH1 is not combined in accordance with the size of paper finally printed out, but it can be correctly combined as intended by the user.

Although the composite image is printed out on paper in the first embodiment, the composite image may be displayed on the display unit.

(Second Embodiment)

Next, a detailed procedure of obtaining a composite print by using a composite print setting sheet SH2 in a second embodiment will be described.

The memory card control means 29 in FIG. 2 performs a read/write processing on the image file stored in the memory card attached into the card slot 14. The memory card control means 29 analyses the details of the image data information stored in the memory card, manages a directory, and assigns the image number to the image data in a one-to-one relation.

To be specific, the memory card control means 29 acquires an aspect ratio of a predetermined image.

The system control means 26 sets an area, in which the handwritten original is to be written, based on the aspect ratio of the predetermined image. The system control means 26 also sets a writing prohibited area for the handwritten original. Further, the system control means 26 sets a recommended area, in which the handwritten original is to be written.

The image processing means 28 combines the predetermined image and the handwritten original with each other.

Figure 8:
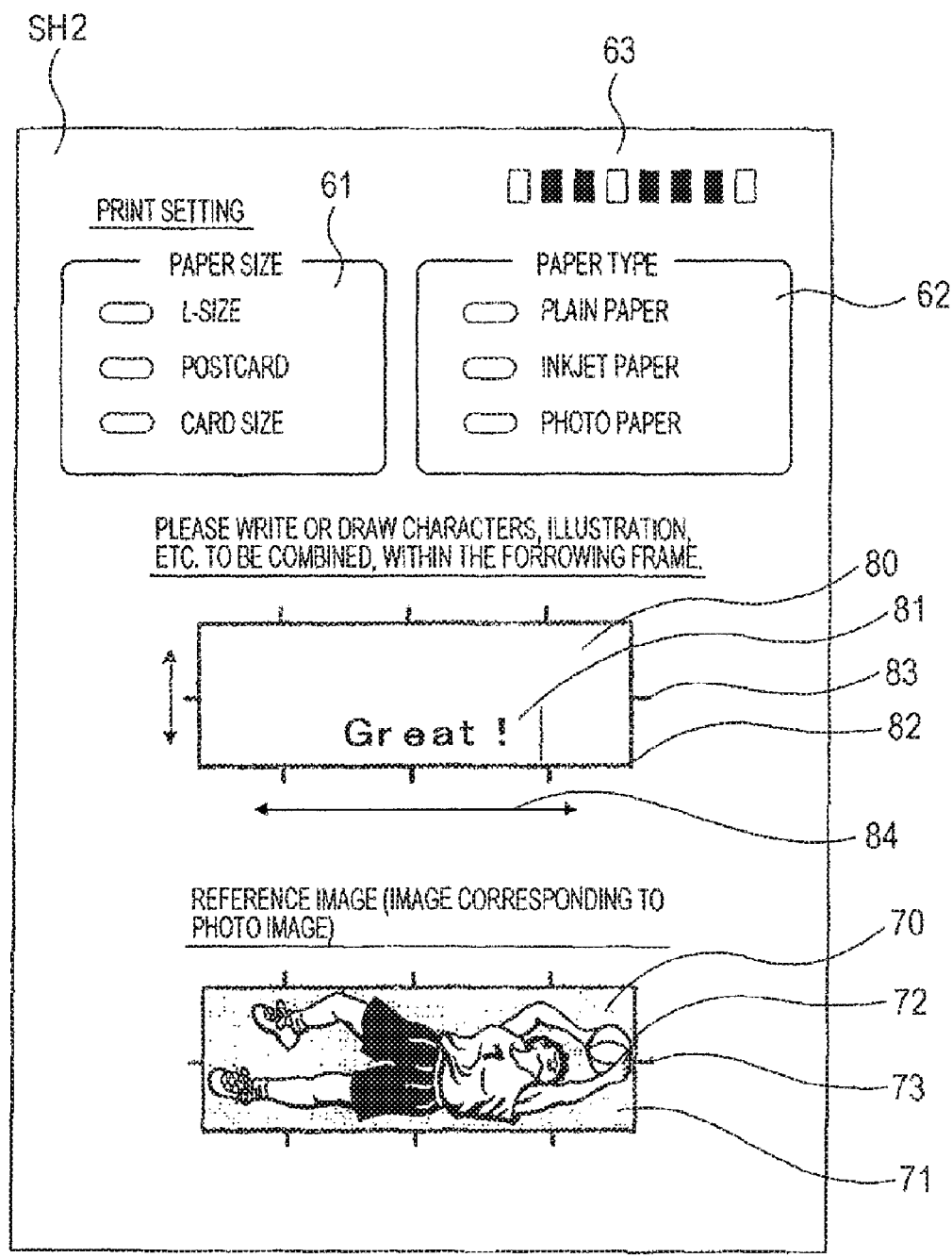
FIG. 8 is a view showing the composite print setting sheet SH1 used in a second embodiment.

FIG. 8 is a view showing the composite print setting sheet SH2 used in the second embodiment.

The composite print setting sheet SH2 is a setting sheet for combining the photographic image and the handwritten original with each other. A sheet serves to allow the user to set in a comprehensive manner as to which photographic image of a plurality of photographic images stored in the memory card is referred to and at which position in the referred image the handwritten image is combined.

The composite print setting sheet SH2 includes a paper size setting area 61, a paper type setting area 62, a barcode 63, a reference image area 70, and a handwriting area 80. The reference image area 70 and the handwriting area 80 are printed adjacent to each other.

Figure 9:
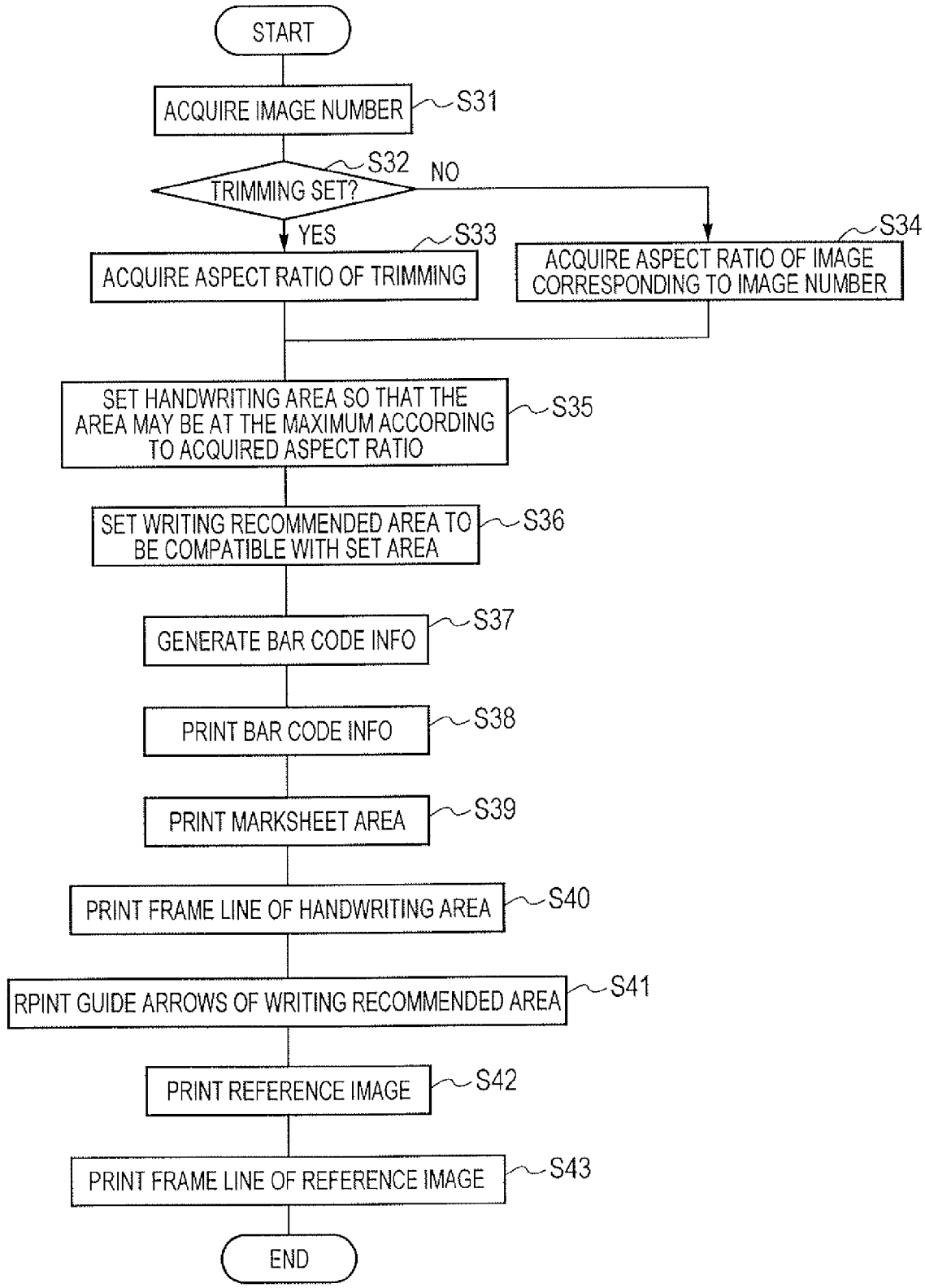
FIG. 9 is a flowchart showing a procedure of printing the composite print setting sheet SH1 in the second embodiment.

FIG. 9 is a flowchart showing a procedure of printing the composite print setting sheet SH2. The user operates the operation section 16 to select an image to be combined with reference to the liquid crystal display unit 15 and then starts printing the composite print setting sheet SH2. For the image to be selected, the user is free to set a trimming area. It is assumed that the paper size of the composite print setting sheet SH2, on which the printing is performed, is A4.

First, an image number corresponding to the image selected by the user is acquired (S31). It is then judged whether or not trimming has been set for the image data corresponding to the image number (S32). If the trimming area is preset, an aspect ratio of the trimming area is acquired (S33). If the trimming area is not set, an aspect ratio of the image data corresponding to the image number is acquired (S34). Next, in accordance with the aspect ratio acquired in the step of acquiring the aspect ratio (S33) or (S34), the handwriting area 80 printed on the composite print setting sheet SH2 is set to be maximized (S35). An upper limit value of the handwriting area 80 is predetermined, and the handwriting area 80 is set not to exceed the upper limit value. Next, in accordance with the area set in the step of setting the handwriting area 80 (S35), a writing recommended area is set (S36). The writing recommended area determines the largest cutout area for the selectable paper sizes of the print setting sheet SH2 when the data after the combination is printed.

Next, information of the image number of the photographic image, trimming information, and information of the handwriting area are generated as barcode information for reference in final printing (S37). Next, based on the barcode information generated in the step of generating the barcode information (S37), the barcode information is printed (S38). A mark sheet area for marking the print setting is printed (S39).

Next, based on the handwriting area set in the step of setting the handwriting area 80 (S35), a frame line 82 for designating an area, in which a character or an illustration is to be written or drawn, is printed (S40). In this step, the printing of the guide marks 83 is performed at the position based on the set area.

Next, based on the writing recommended area set in the step of setting the writing recommended area (S36), guide arrows 84 indicating the writing recommended area are printed (S41).

Subsequently, a reference image 71 is printed in the reference image area 70 (S42). If the trimming area is set, the trimming processing is performed in accordance with the trimming area. Next, a reference image frame line 72 with guide marks 73 for allowing the recognition of the relative position with the handwriting area 80 is printed outside of the reference image 71 (S43).

For the print processing executed in Step S38 to Step S43, a processing of generating barcode rectangular data, a processing of decoding image data in the memory card, a color space conversion processing, a binarization processing for printout, and the like are executed. Those processings can be realized by a known technique and do not affect the nature of the present invention. Therefore, the detailed description thereof is herein omitted.

By the above-mentioned procedure, the composition print setting sheet SH2 shown in FIG. 8 can be printed out. On the composite print setting sheet SH2, the handwriting area 80 is printed at the same aspect ratio as that of the reference image 71. Further, because guide arrows 84 indicating the writing recommended area, in which a character or an illustration is to be written or drawn, are printed, it is found that the character or the illustration is written or drawn in accordance with the guide arrows 84.

The paper size of the composite print setting sheet SH2 is A4 in the second embodiment. However, various paper sizes can be treated by the execution of the above-mentioned procedure. Further, even when the layout or the design of the composite print setting sheet SH2 is changed, the composite print setting sheet SH2 can be used without any change. Therefore, the present invention is not limited to the size or the layout of the A4 paper in the second embodiment.

Next, since a procedure of reading the composite print setting sheet SH2 to perform the final printing is substantially the same as the procedure shown in FIG. 5 in the first embodiment, only differences in the procedure will be described.

The barcode 63 printed on the print setting sheet SH2 is read (S21). Information of the read barcode 63 is analyzed (S22). As the information of the barcode 63, in addition to the image number and the trimming information as printed on the print setting sheet SH1 in step S9, the writing area is also recorded.

For reading the handwritten original 51 written in the handwriting area 50 (S24), the read is performed by using the information of the writing area analyzed in Step S22.

Because the subsequent processing is the same as that in the first embodiment, the description thereof is omitted.

Figure 10A:
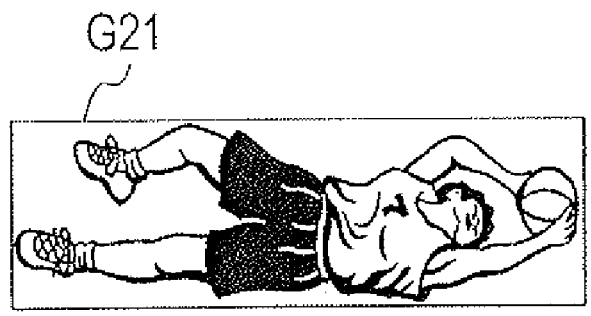
FIGS. 10A, 10B and 10C are views each showing the result of combination in the second embodiment.
Figure 10B:
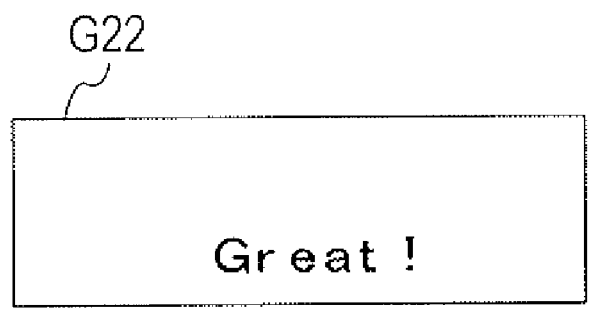
Figure 10C:

FIGS. 10A, 10B and 10C are views each showing the result of combination in the second embodiment. A photographic image G21 represents data of an image to be combined. A composite image SG23 corresponds to the combination of a handwritten image G22 generated in accordance with an aspect ratio of the photographic image G21 and the photographic image G21. The composite image SG23 shows that handwritten characters are combined at the position intended by the user.

According to the second embodiment, the handwriting area 80 is set in accordance with the aspect ratio of the selected photographic image through the composite print setting sheet SH2. Therefore, the positional relation of the handwritten character or the handdrawn illustration on the print setting sheet SH2 can be correctly combined as intended by the user.

Although the composite image is printed out on print paper in the second embodiment, the composite image may be displayed on the display unit.

(Third Embodiment)

Figure 11:
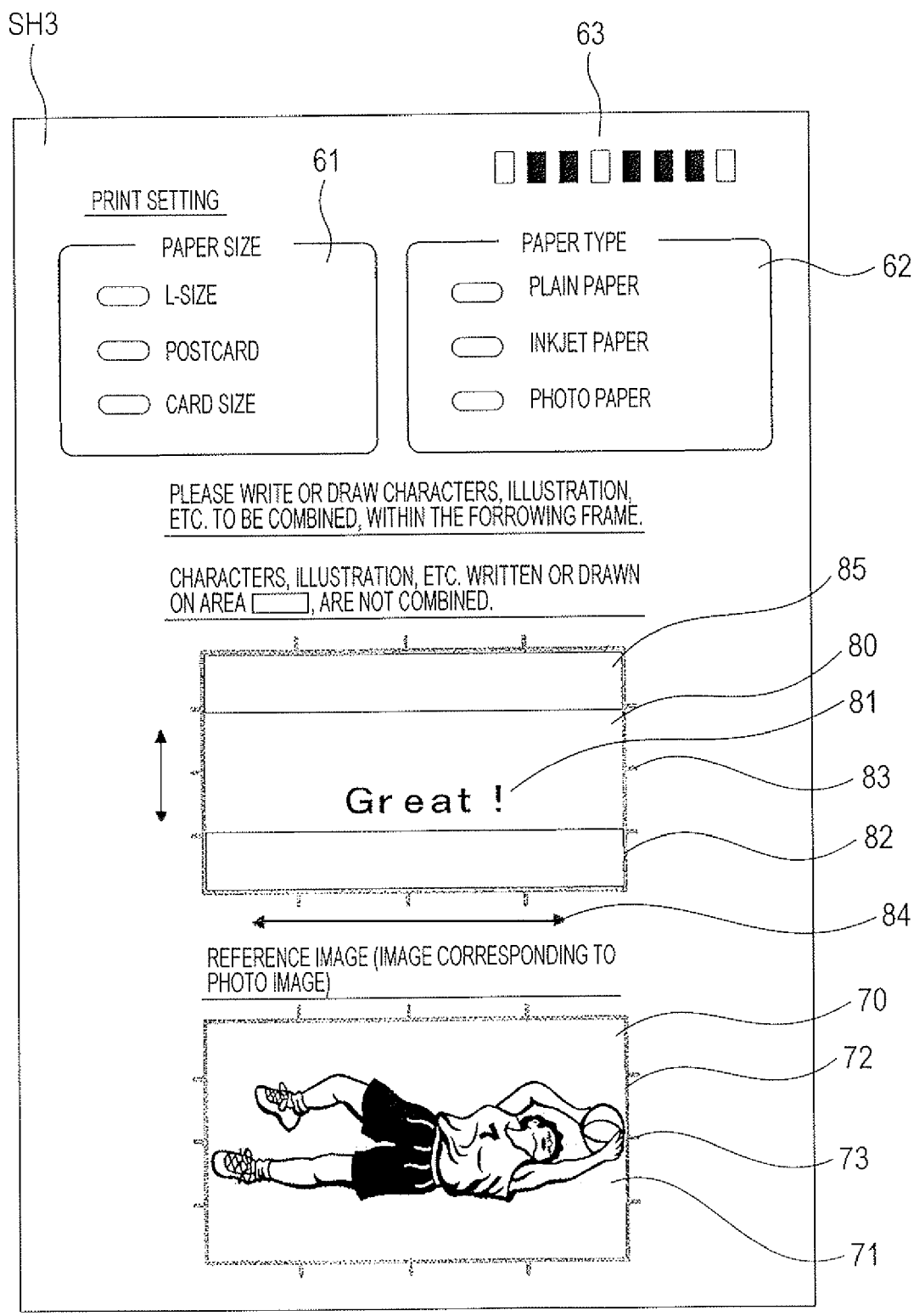
FIG. 11 is a view showing a composite print setting sheet SH2 used in a third embodiment.

FIG. 11 is a view showing a composite print setting sheet SH3 used in the third embodiment. Among the reference numerals in the drawings in the third embodiment, the same reference numerals as those in the second embodiment have already been described. Therefore, the detailed description thereof is herein omitted. The composite print setting sheet SH3 includes the paper size setting area 61, the paper type setting area 62, the barcode 63, the reference image area 70, and the handwriting area 80, which are described in the second embodiment. The composite print setting sheet SH3 further includes a writing prohibited area 85 indicating an area, in which a handwritten character or a handdrawn illustration is not combined, to the user. This area is set in accordance with the aspect ratio of the photographic image or of the set trimming. The handwritten character or the handdrawn illustration in this area is not combined.

Figure 12:
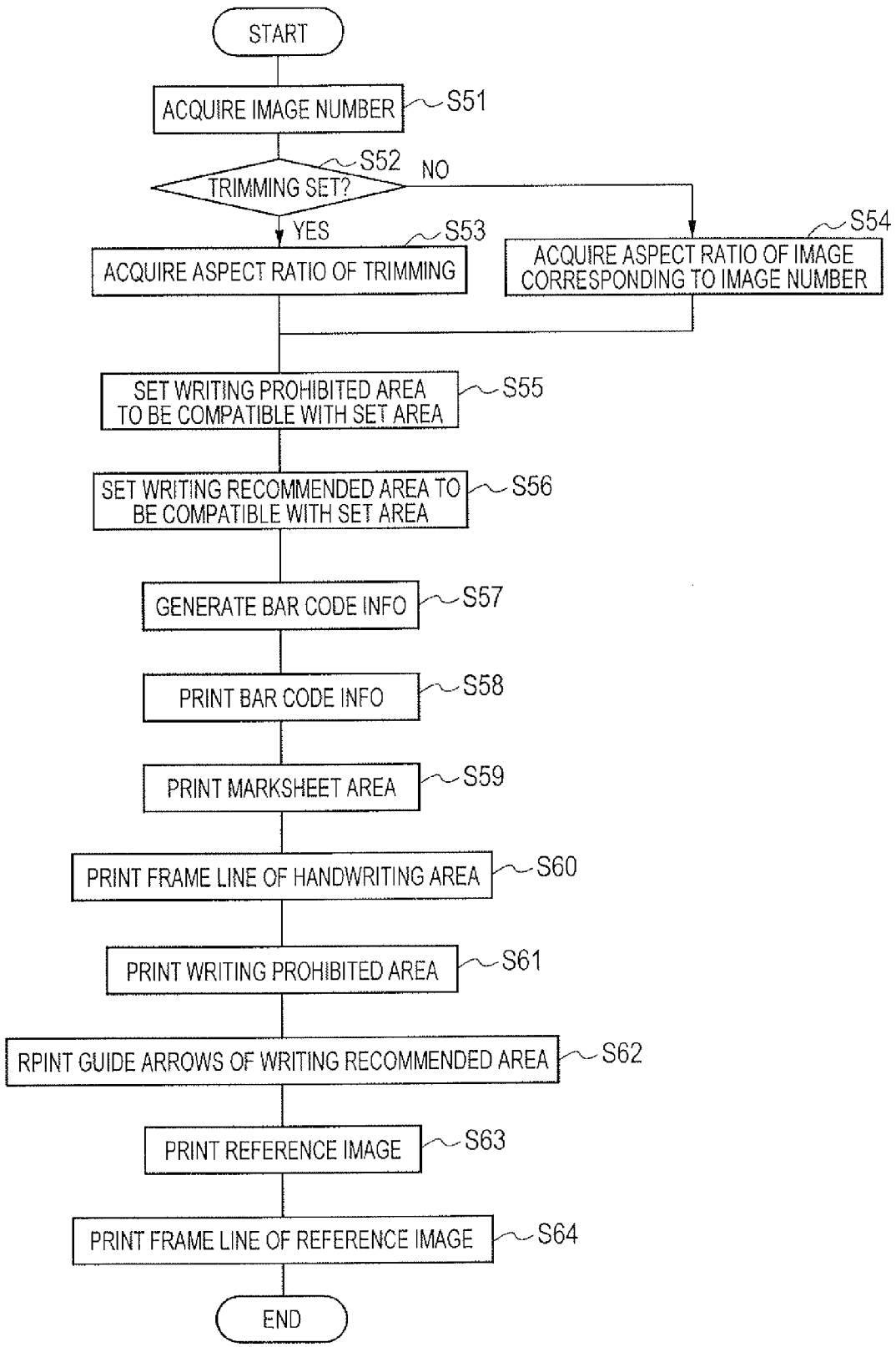
FIG. 12 is a flowchart showing a procedure of printing the composite print setting sheet SH2 in the third embodiment.
Figure 13A:
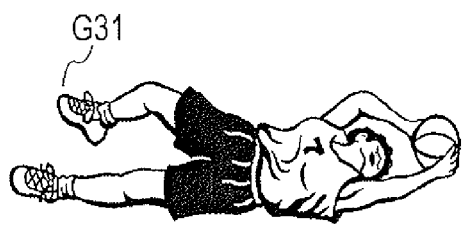
FIGS. 13A, 13B, 13C, 13D and 13E are views each explaining another embodiment of the positional relation between a photographic image and a handwritten character or handdrawn illustration when the conventional composite print setting sheet is used.
Figure 13B:
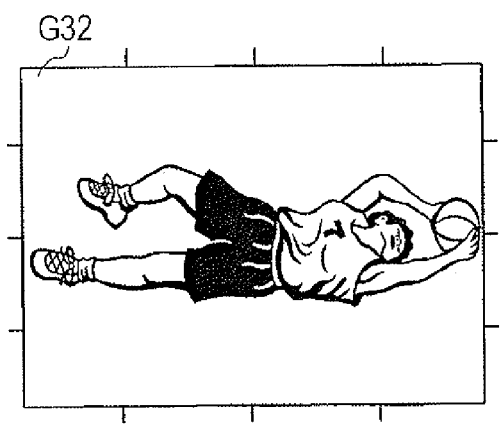
Figure 13D:
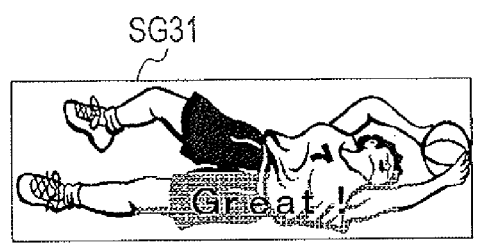
Figure 13C:
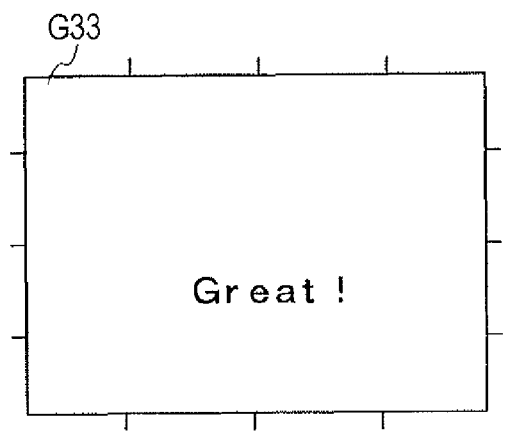
Figure 13E:
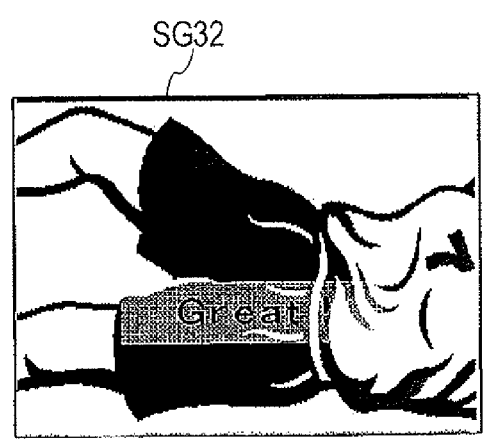

FIG. 12 is a flowchart showing a procedure of printing out the composite print setting sheet SH3 in the third embodiment.

As in the second embodiment, the user operates the operation section 16 and then printing-out of the composite sheet is started.

First, an image number corresponding to the image selected by the user is acquired (S51). It is then judged whether or not trimming has been set for the image data corresponding to the image number (S52). If the trimming area is preset, an aspect ratio of the trimming area is acquired (S53). If the trimming area is not set, an aspect ratio of the image data corresponding to the image number is acquired (S54). Next, the aspect ratio acquired in the step of acquiring the aspect ratio (S53) or (S54) and the preset handwriting area 80 are compared with each other to set the writing prohibited area 85 for prohibiting writing or drawing of a character or an illustration (S55).

Next, in accordance with the area set in the step of setting the writing prohibited area 85 (S55), a writing recommended area is set (S56). The writing recommended area determines the largest cutout area for the selectable paper sizes of the print setting sheet SH3 when the data after the combination is printed.

Next, information of the image number of the photographic image, trimming information, and information of the handwriting area are generated as barcode information for reference in final printing (S57). Next, based on the barcode information generated in the step of generating the barcode information (S57), the barcode information is printed (S58). A mark sheet area for marking the print setting is printed (S59).

Next, based on the preset handwriting area 80, the frame line 82 for designating an area, in which a character or an illustration is to be written or drawn, is printed (S60). In this step, the printing of the guide marks 83 is performed at the position based on the set area.

Next, the writing prohibited area 85 for prohibiting the write of the handwritten character or the handdrawn illustration is printed (S61). Based on the writing recommended area set in the step of setting the writing recommended area (S56), the guide arrows 84 indicating the writing recommended area are printed (S62).

Next, the reference image 71 is printed in the reference image area 70 (S63). If the trimming area is set, the trimming processing is performed in accordance with the trimming area. Next, the frame line 72 for the reference image with the guide marks 73 for allowing the recognition of the relative position with the handwriting area 80 is printed outside of the reference image 71 (S64).

By the above-mentioned procedure, the composite print setting sheet SH3 shown in FIG. 11 can be printed out. On the composite print setting sheet SH3, the writing prohibited area 85 is printed in accordance with the same aspect ratio as that of the reference image 71. It is regarded that the user writes or draws a character or an illustration while avoiding the area designated by the writing prohibited area 85. Further, because the guide arrows 84 indicating the recommended area, in which the character is written or the illustration is drawn, are printed as in the second embodiment, it is regarded that the character is written or the illustration is drawn in accordance with the guide arrows 84.

On the composite print setting sheet SH3 in the third embodiment, the layout is determined to locate the reference image 71 in the center with respect to the frame line 72 for printout. The position is not limited that in the third embodiment as long as the relative position of the writing prohibited area 85 and the reference image 71 is identical.

The information of the handwriting area is added to the barcode information referred to for the final printing. However, the information of the handwriting area can be calculated at the time of final printing based on the aspect ratio of the image or of the trimming information, and the barcode information is not limited thereto.

Because a procedure of the final printing is the same as that of the flowchart shown in FIG. 5 described in the second embodiment, the detailed description thereof is herein omitted.

The composite image is output on print paper in the third embodiment as in the second embodiment. However, the composite image may be displayed on the display unit.

Each of the above-mentioned embodiments can be recognized as the invention of a program. To be specific, the second embodiment includes: a predetermined image aspect ratio acquisition procedure of acquiring a predetermined image aspect ratio corresponding to an aspect ratio of a predetermined image; a writing area setting procedure of setting an area in which a handwritten original is to be written or drawn; and a combining procedure of combining the predetermined image and the handwritten original with each other. In the above-mentioned writing area setting procedure, there is provided a program causing an image processing apparatus to set the writing area in accordance with the aspect ratio of the predetermined image.

In addition to the second embodiment, the third embodiment further includes a writing prohibited area setting procedure of setting a writing prohibited area of the handwritten original. In the above-mentioned writing prohibited area setting procedure, there is provided a program causing an image processing apparatus to set the writing prohibited area in accordance with the aspect ratio of the predetermined image.

The above-mentioned embodiments can be recognized as an invention of another program. To be specific, there is provided a program causing an image processing apparatus to execute: a handwriting area aspect ratio acquisition procedure of acquiring a handwriting area aspect ratio corresponding to an aspect ratio of a handwriting area in which a handwritten original is to be written; a predetermined image aspect ratio acquisition procedure of acquiring a predetermined image aspect ratio corresponding to an aspect ratio of a predetermined image; an aspect ratio comparison procedure of comparing the handwriting area aspect ratio and the predetermined image aspect ratio with each other; a cutout area setting procedure of setting an area of cutting out the predetermined image in accordance with the handwritten original area aspect ratio when the handwriting area aspect ratio and the predetermined image aspect ratio differ from each other; a predetermined image cutout procedure of cutting out the predetermined image based on the cutout area set in the cutout area setting procedure; and a combination procedure of combining the image obtained by cutting out in the predetermined image cutout procedure and the handwritten original with each other While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-189486, filed Jun. 29, 2005, and No. 2006-164707 filed Jun. 14, 2006, which are hereby incorporated by reference herein in their entirety.

What is claimed is:

1. An image processing apparatus comprising:
a selecting unit configured to select an image from a plurality of images stored in a memory;
a generating unit configured to generate a sheet image comprising:
an area to be combined with the selected image;
the selected image; and
a paper size setting area, providing at least two portions, each listing a different paper size for a sheet on which the selected image and an image of the area to be combined with the selected image are combined and printed, that is selectable by a user;
a determining unit configured to determine an aspect ratio of the area to be combined with the selected image as the generating unit generates the sheet image;
a print control unit configured to cause a printing apparatus to print, on a sheet, the sheet image generated by the generating unit comprising the area to be combined with the selected image whose the aspect ratio has been determined by the determining unit, the selected image, and the paper size setting area;
an inputting unit configured to input a read image of the sheet on which the sheet image generated by the generating unit is printed by the print control unit, by reading the image of the sheet by a reading apparatus; and
a combination unit configured to combine a part of the read image input by the inputting unit, corresponding to the area indicated in the sheet image, with the selected image,
wherein the determining unit, in accordance with the selection of the image from the plurality of images stored in the memory by the selecting unit, acquires an aspect ratio of the image which has been selected by the selecting unit, and determines the aspect ratio of the area to be combined with the selected image so as to be fitted to the acquired aspect ratio,
wherein the determining unit also determines a writing recommended area of the area to be combined with the selected image whose aspect ratio was determined by the determining unit, the writing recommended area determining the largest cutout area for the selected paper size selected by the user, and
wherein the generating unit generates the sheet image in which the aspect ratio of said image selected by the selecting unit and the aspect ratio of the area to be combined with the selected image are fitted to each other.

2. An image processing apparatus according to claim 1, wherein the selected image selected by the selecting unit comprises a photographic image.

3. An image processing apparatus according to claim 1, wherein the generating unit generates a sheet image including a predetermined area in which the area to be combined with the selected image can be set, and the generating unit generates a sheet image in which the area to be combined with the selected image by setting a writing prohibited area in the predetermined area in accordance with the aspect ratio determined by the determining unit.

4. An image processing apparatus according to claim 1, further comprising trimming unit configured to trim the image selected by the selecting unit,
wherein the determining unit determines an aspect ratio of the area to be combined with the selected image in the sheet image generated by the generating unit as an aspect ratio of the image trimmed by the trimming unit.

5. An image processing method comprising:
selecting an image from a plurality of images stored in a memory;
acquiring an aspect ratio of the selected image and determining an aspect ratio of an area to be combined with the selected image in a sheet image so as to be fitted to the acquired aspect ratio of the selected image;
determining a writing recommended area of the area to be combined with the selected image whose aspect ratio was determined, the writing recommended area determining the largest cutout area for a selected paper size of paper selected by a user and on which the selected image and the area to be combined with the selected image are combined;
generating a sheet image, the sheet image comprising:
the area to be combined with the selected image;
the selected image, wherein the aspect ratio of the selected image and the aspect ratio of the area to be combined with the selected image are fitted to each other; and
a paper size setting area, providing at least two portions, each listing a different paper size for the paper on which the selected image and an image of the area to be combined with the selected image are to be combined, that is selectable by the user;
causing a printing apparatus to print the generated image on a sheet;
inputting a read image of the sheet on which the generated image is printed, by reading the image of the sheet by reading apparatus; and
combining a part of the input image corresponding to the area indicated in the sheet, with the selected image on a paper whose size was selected by the user in the paper size settings area on the printed sheet.

6. An image processing apparatus comprising:
a selecting unit configured to select an image from a plurality of images stored in a memory;
a generating unit configured to generate a sheet image comprising:
an area to be combined with the selected image having a predetermined aspect ratio,
a reference image corresponding to a selected image selected by the selecting unit, and
a bar code corresponding to the selected image and readable by the image processing apparatus to retrieve the selected image corresponding to the bar code,
wherein the generating unit generates the sheet image in which an aspect ratio of the reference image is fitted to an aspect ratio of the area to be combined with the selected image by changing the aspect ratio of the reference image into the predetermined aspect ratio and by setting a trimming area of the reference image to minimize an area to be cut out from the selected image when the selected image is combined with an image of the area to be combined with the selected image, when the aspect ratio of the selected image selected by the selecting unit is different from the predetermined aspect ratio;
wherein the generating unit generates the bar code to contain trimming information on the set trimming area, readable by the image processing apparatus and usable by the image processing apparatus when the selected image is decoded and combined with the image of the area to be combined with the selected image;
a print control unit configured to cause a printing apparatus to print the sheet image generated by the generating unit on a sheet;
an inputting unit configured to input a read image of the sheet on which the sheet image generated by the generating unit is printed by the print control unit, by reading the image of the sheet by a reading apparatus; and
a combination unit configured to combine a part of the read image input by the inputting unit, corresponding to the area indicated in the sheet image, with the selected image stored in the memory,
wherein the combination unit combines the read image of the area to be combined with the selected image and the selected image stored in the memory in an overlapping manner, by using the trimming information and by cutting out a trimming area of the selected image in accordance with the aspect ratio of the area to be combined with the selected image and the trimming information, when the aspect ratio of the selected image is different from the aspect ratio of the area to be combined with the selected image.

7. An image processing apparatus according to claim 6, further comprising a card slot for attaching a memory card which stores a plurality of images;
wherein the selecting unit selects an image stored on the memory card.

8. An image processing apparatus according to claim 6, wherein the generating unit generates a sheet image in which the selected image and the area to be combined with the selected image are arranged adjacent to each other.

9. An image processing apparatus according to claim 6, wherein the generating unit generates a sheet image including a code indicating an area corresponding to the reference image in the selected image, and the combination unit specifies the area corresponding to the reference image in the selected image stored in the memory, based on the code included in the read image input by the inputting unit.

10. An image processing apparatus according to claim 9, further comprising a second print control unit cause a printing apparatus to print an image which is obtained by the combination unit.

11. An image processing apparatus according to claim 6, wherein the generating unit trims a reference image from the selected image selected by the selecting unit in accordance with a predetermined aspect ratio, and the combination unit combines the image in the area in the selected image and the part of the read image in an overlapping manner, by specifying the area in which the reference image is trimmed in the selected image stored in the memory.

12. An image processing method comprising:
selecting an image from a plurality of images stored in a memory;
generating a sheet image comprising:
an area to be combined with the selected image having a predetermined aspect ratio;
a reference image corresponding to the selected image, and
a bar code corresponding to the selected image and readable by an image processing apparatus to retrieve the selected image corresponding to the bar code, wherein an aspect ratio of the reference image of the generated sheet image is fitted to an aspect ratio of the area to be combined with the selected image, by changing the aspect ratio of the reference image into the predetermined aspect ratio when the aspect ratio of the selected image is different from the predetermined aspect ratio and by setting a trimming area of the reference image to minimize an area to be cut out from the selected image when the selected image is combined with an image of the area to be combined with the selected image;

wherein the generating step generates the bar code to contain trimming information on the set trimming area, readable by the image processing apparatus and usable by the image processing apparatus when the selected image is decoded and combined with the image of the area to be combined with the selected image;

causing a printing apparatus to print the generated sheet image on a sheet;

inputting a read image of the sheet on which the generated sheet image is printed, by reading the image of the sheet by a reading apparatus; and combining a part of the inputted read image corresponding to the area indicated in the sheet, with the selected image, wherein the read image of the area to be combined with the selected image and the selected image stored in the memory are combined in an overlapping manner, by cutting out a trimming area of the selected image in accordance with the aspect ratio of the area to be combined with the selected image, when the aspect ratio of the selected image is different from the aspect ratio of the area to be combined with the selected image.

\* \* \* \* \*